(12) United States Patent
Dickey et al.

(10) Patent No.: US 11,368,203 B1
(45) Date of Patent: Jun. 21, 2022

(54) ONE WAY RANGING MEASUREMENT USING SOUNDING SEQUENCE

(71) Applicant: Silicon Laboratories Inc., Austin, TX (US)

(72) Inventors: Terry Lee Dickey, Austin, TX (US); Yan Zhou, Spicewood, TX (US); Wentao Li, Austin, TX (US); Michael Wu, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/486,042

(22) Filed: Sep. 27, 2021

Related U.S. Application Data (60) Provisional application No. 63/221,151, filed on Jul. 13, 2021.

(51) Int. Cl.
*H04B 7/06* (2006.01)
*H04L 7/00* (2006.01)
*H04L 5/00* (2006.01)

(52) U.S. Cl.
CPC ......... *H04B 7/0667* (2013.01); *H04L 5/0048* (2013.01); *H04L 7/0008* (2013.01); *H04L 7/0033* (2013.01)

(58) Field of Classification Search
CPC ... H04B 7/0667; H04L 5/0048; H04L 7/0008; H04L 7/0033
USPC ......................................................... 375/262
See application file for complete search history.

(56) References Cited

U.S. PATENT DOCUMENTS

2012/0300874 A1* 11/2012 Zhang ..................... H04L 69/22
375/295
2022/0124447 A1* 4/2022 Patil ........................ H04S 7/302

\* cited by examiner

*Primary Examiner* — Fitwi Y Hailegiorgis
(74) *Attorney, Agent, or Firm* — Nields, Lemack & Frame, LLC (57) ABSTRACT

A system and method for one-way ranging is disclosed. The system comprises a transmitter, also referred to as a tag, transmitting a packet having a sounding sequence. The receiver, also referred to as the locator, receives the sounding sequence. The receiver measures and saves the phase at a plurality of points in time. The sounding sequence has two frequencies, which are additive inverses of one another. A discrete Fourier transform is performed on the plurality of phase measurements to determine the phase of each of the two frequencies. The difference between these two frequencies is related to the time that the packet traveled. Additionally, a calibration of the transmit path and/or receive path may be performed to improve the accuracy of the results.

19 Claims, 5 Drawing Sheets

ONE WAY RANGING MEASUREMENT USING SOUNDING SEQUENCE

This application claims priority to U.S. Provisional Patent Application 63/221,151, filed Jul. 13, 2021, the disclosure of which is incorporated in its entirety.

FIELD

This disclosure describes systems and methods for determining a distance between network devices, and more particularly for determining a distance without establishing a connection between the network devices.

BACKGROUND

There is currently interest in expanding current network protocols to allow the possibility for a network device to determine the distance to another network device. For example, the Bluetooth specification is being modified to include High Accuracy Distance Measurement (HADM). As currently proposed, HADM discloses basic measurement techniques for two-way ranging. Two-way ranging requires the establishment and maintenance of a network connection between an initiator and a reflector. Since a network connection is established, security can be provided. However, by requiring a network connection, HADM is difficult to scale to a large number of network devices being tracked.

Therefore, it would be beneficial if there were a system and method to determine the distance between two network devices without requiring the establishment of a network connection between these two network devices. Further, it would be advantageous if these system and method were as accurate as the current HADM process.

SUMMARY

A system and method for one-way ranging is disclosed. The system comprises a transmitter, also referred to as a tag, transmitting a packet having a sounding sequence. The receiver, also referred to as the locator, receives the sounding sequence. The receiver measures and saves the phase at a plurality of points in time. The sounding sequence has two frequencies, which are additive inverses of one another. A discrete Fourier transform is performed on the plurality of phase measurements to determine the phase of each of the two frequencies. The difference between these two frequencies is related to the time that the packet travelled. Additionally, a calibration of the transmit path and/or the receive path may be performed to improve the accuracy of the results.

According to one embodiment, a method of determining a distance between two network devices is disclosed. The method comprises transmitting, from a first network device, a packet comprising a sounding sequence, wherein the sounding sequence comprises a first frequency and a second frequency that are additive inverses of each other; receiving, at a second network device, the packet with the sounding sequence; sampling, at the second network device, the packet with the sounding sequence using a sample clock to create a plurality of phase samples; calculating a digital Fourier transform of the plurality of phase samples to obtain real and imaginary components at each of the first frequency and the second frequency; calculating a first phase of the first frequency and a second phase of the second frequency using the real and imaginary components; and using the first frequency, the first phase and the second phase to determine a distance from the second network device to the first network device. In certain embodiments, calculating the digital Fourier transform is performed by the second network device. In some embodiments, the method comprises removing a carrier frequency from the sounding sequence prior to the sampling. In certain embodiments, the first network device transmits a transmitter phase correction value to the second network device prior to the packet with the sounding sequence, the transmitter phase correction value being a difference in phase delay through transmit components of the first network device at the first frequency and the second frequency, and wherein the second network device uses the transmitter phase correction value to determine the distance from the second network device to the first network device. In some embodiments, a receiver group delay is calculated for the second network device, the receiver group delay defined as a difference in phase delay through read components of the second network device at the first frequency and the second frequency, and the second network device uses the receiver group delay to determine the distance from the second network device to the first network device. In certain embodiments, the plurality of phase samples comprises at least 300 phase samples. In some embodiments, the sounding sequence is sampled at a frequency that is greater than the first frequency. In certain embodiments, the sounding sequence is sampled at a frequency that is at least 5 times greater than the first frequency. In some embodiments, the first frequency and the second frequency are separated by at least 250 kHz. In certain embodiments, the first frequency and the second frequency are separated by at least 1 MHz.

According to another embodiment, network device for calculating a distance between the network device and a first network device is disclosed. The network device comprises a network interface; a processing unit, and a memory device in communication with the processing unit, which comprises instructions, which when executed by the processing unit, enable the network device to: receive, using the network interface, a packet with a sounding sequence, wherein the sounding sequence comprises a first frequency and a second frequency that are additive inverses of each other; sample the packet with the sounding sequence using a sample clock to create a plurality of phase samples; calculate a digital Fourier transform of the plurality of phase samples to obtain real and imaginary components at each of the first frequency and the second frequency; calculate a first phase of the first frequency and a second phase of the second frequency using the real and imaginary components; and use the first frequency, the first phase and the second phase to determine a distance from the network device to the first network device. In certain embodiments, the memory device further comprises instructions which enable the network device to remove a carrier frequency from the sounding sequence prior to the sampling. In some embodiments, the first network device transmits a transmitter phase correction value to the network device prior to the packet with the sounding sequence, the transmitter phase correction value being a difference in phase delay through transmit components of the first network device at the first frequency and the second frequency, and the network device uses the transmitter phase correction value to determine the distance from the network device to the first network device. In some embodiments, a receiver group delay is calculated for the network device, the receiver group delay defined as a difference in phase delay through read components of the network device at the first frequency and the second frequency, and the network device uses the receiver group delay to determine the distance from the network device to the first network device. In certain embodiments, the plurality of phase samples comprises at least 300 phase samples. In some embodiments, the sounding sequence is sampled at a frequency that is greater than the first frequency. In certain embodiments, the sounding sequence is sampled at a frequency that is at least 5 times greater than the first frequency. In some embodiments, the first frequency and the second frequency are separated by at least 250 kHz. In certain embodiments, the first frequency and the second frequency are separated by at least 1 MHz.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
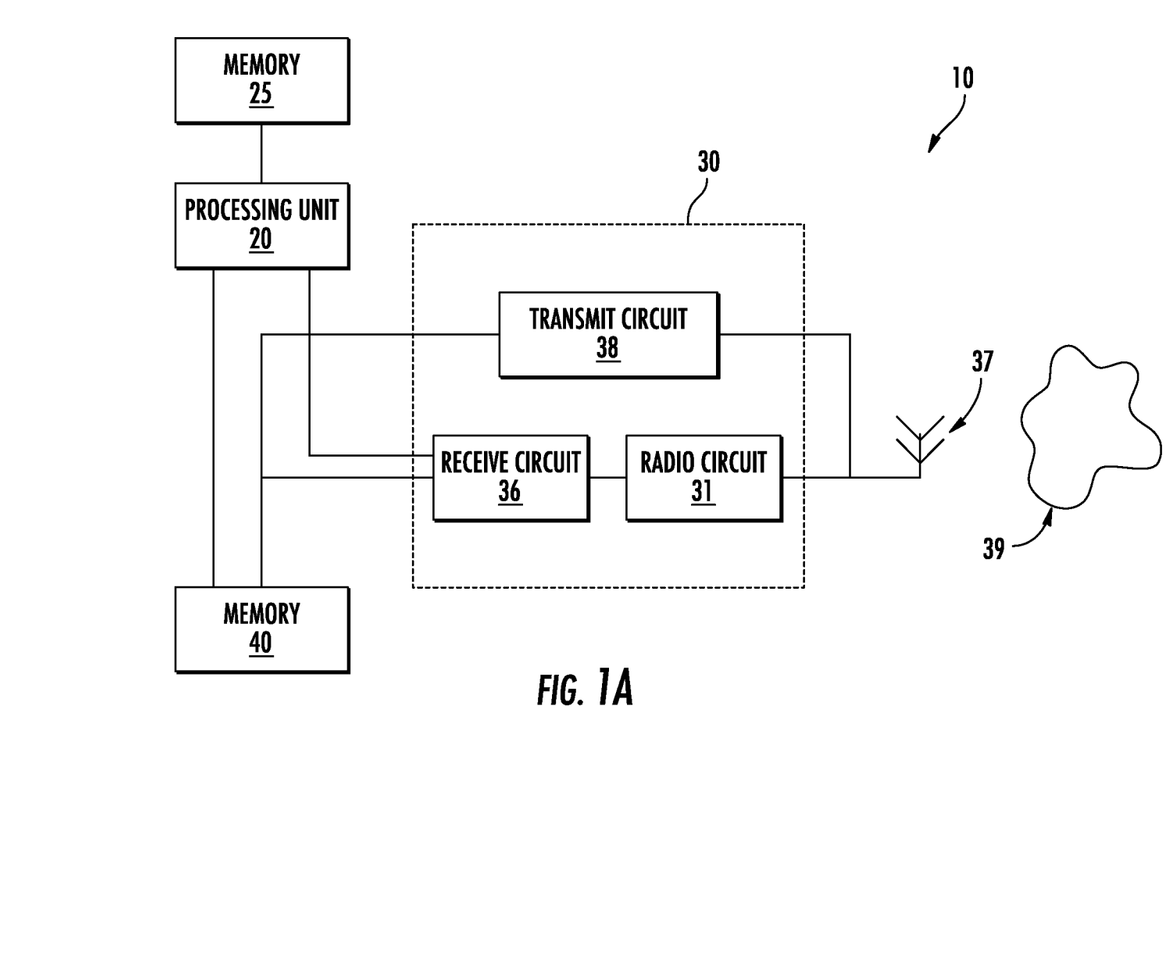
FIG. 1A is a block diagram of a network device that may be used to perform the method described herein.

FIG. 1A shows a network device that may be used to perform the range detection algorithm described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna 37. The network interface 30 may support any wireless network protocol that supports range detection, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a receive circuit 36. The receive circuit 36 is used to receive, synchronize and decode the digital signals received from the radio circuit 31.

Specifically, the receive circuit 36 has a preamble detector that is used to identify the start of an incoming packet. The receive circuit 36 also has a sync detector, which is used to identify a particular sequence of bits that are referred to as a sync character. Additionally, the receive circuit 36 has a decoder which is used to convert the digital signals into properly aligned bytes of data.

The network interface 30 also includes a transmit circuit 38. The transmit circuit 38 may include a power amplifier that is used to supply a signal to be transmitted to the antenna 37.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1A. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1A as separate components, it is understood that some or all of these components may be integrated into a single electronic component. Rather, FIG. 1A is used to illustrate the functionality of the network device 10, not its physical configuration.

Although not shown, the network device 10 also has a power supply, which may be a battery or a connection to a permanent power source, such as a wall outlet.

Figure 1B:
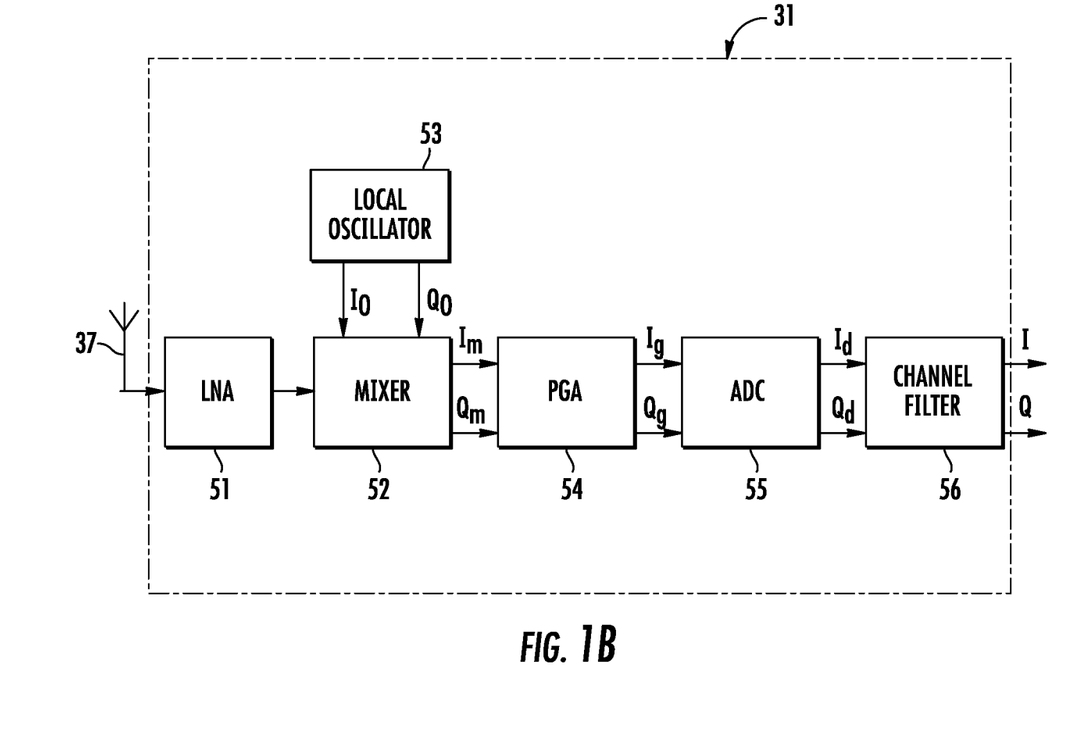
FIG. 1B is a block diagram of the radio circuit.

FIG. 1B shows a block diagram of the radio circuit 31. The wireless signals first enter the radio circuit 31 through the antenna 37. This antenna 37 is in electrical communication with a low noise amplifier (LNA) 51. The LNA 51 receives a very weak signal from the antenna 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30.

Importantly, the ADC 55 is used to create the digital signals that are used to determine the phase of the incoming analog signal. Thus, the sample clock used by the ADC 55 to sample the incoming analog signal may oversample the incoming signal.

Having described the basic architecture of the network device, a description of the one way ranging procedure will be provided.

Figure 2A:
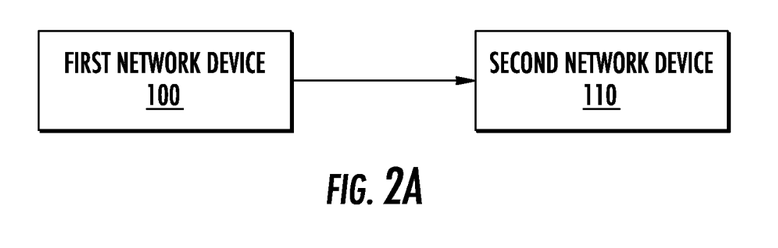
FIG. 2A shows a first network device transmitting a sounding sequence to a second network device.

First, referring to FIG. 2A, assume a first network device 100, also referred to as the tag or transmitter, transmits a packet, having a sounding sequence. In this embodiment, the packet may comprise a preamble, which is used to synchronize the clock of the receiver to the frequency and phase of the incoming signal. Next, a sync character may follow. The sync character is a predetermined sequence of bits that are used to denote the boundary between symbols. In some embodiments, the sync character may be referred to as an "Access Address". The sounding sequence follows the sync character. In some embodiments, additional fields may be present in the packet, such as between the sync character and the sounding sequence. A sounding sequence is a periodic waveform that provides two different frequencies. For example, a pattern of 1010101 yields a positive frequency and a negative frequency, which are each one half of the bit rate. So for 1 Mbps Bluetooth, this pattern generates −500 kHz and +500 kHz. If desired lower frequencies can be created by using lower frequency sounding sequences. For example, 11001100 yields −250 kHz and +250 kHz; and 11110000 yields −125 kHz and +125 kHz. Further, if 2 Mbps Bluetooth is utilized, the frequencies noted above would be doubled. Thus, in some embodiments, the sounding sequence is defined such that the positive frequency and the negative frequency are additive inverses of one another. Thus, in some embodiments, the two frequencies are separated by at least 500 kHz. In other embodiments, the two frequencies are separated by at least 1 MHz. In yet other embodiments, the two frequencies are separated by 2 MHz. Note that the sounding sequence is transmitted with a carrier frequency ($f_c$), such that the actual frequencies that are transmitted are $f_c-f$ and $f_c+f$.

Figure 2B:
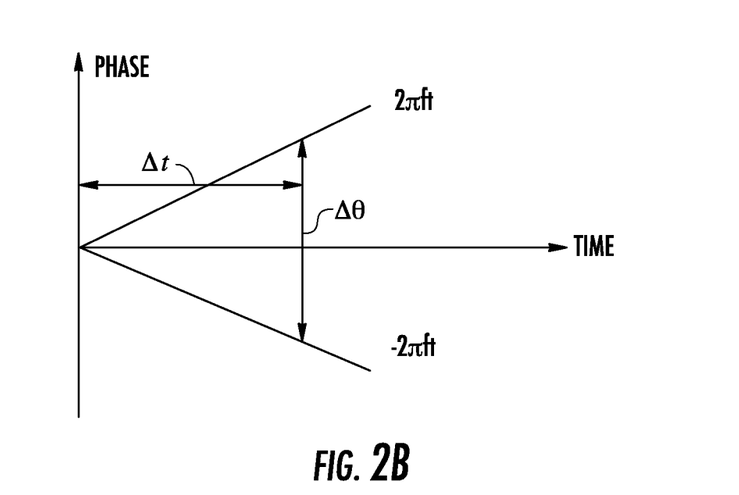
FIG. 2B shows the phase vs. time of an incoming signal.

Thus, by transmitting a sounding sequence to another network device, the first network device 100 is in effect transmitting two frequencies simultaneously. The phase of those two frequencies (f and −f) may be measured by the second network device 110, also referred to as the locator or receiver, are shown in FIG. 2B and are given by:

$$\theta_f = 2\pi f t_p \text{ and } \theta_{-f} = -2\pi f t_p$$

Thus, the difference between the phases of these two frequencies can be given be:

$$\Delta\theta = \theta_f - \theta_{-f} = 4\pi f t_p$$

Thus, if the phase of the two frequencies can be determined, the time of travel can be calculated.

One approach to find the phase of the two frequencies is to utilize discrete Fourier transforms.

For example, assume that the second network device 110 removes the carrier frequency and then measures and records the phase of the sounding sequence in the incoming packet from the first network device 100 over a predetermined time period using a sample clock. In certain embodiments, the sample clock may be 5 times greater than the frequency of the incoming signal. For example, for BLE operating at 1 Mbps, the sample clock may be 5 MHz. For BLE operating at 2 Mbps, the sample clock may be 10 MHz. In other words, the sample clock may be several times greater than the frequency of the sounding sequence. In certain embodiments, the sample clock may be at least 5 times the frequency of the sounding sequence. In some embodiments, the sample clock may be at least 10 times the frequency of the sounding sequence. The plurality of phase measurements may be referred as to $\theta_n$ and may be stored in memory. In certain embodiments, the number of phase measurements may be more than 300. In certain embodiments, the length of the sound sequence may be defined in Bluetooth® High Accuracy Distance Measurement (HADM) standard.

Figure 3:
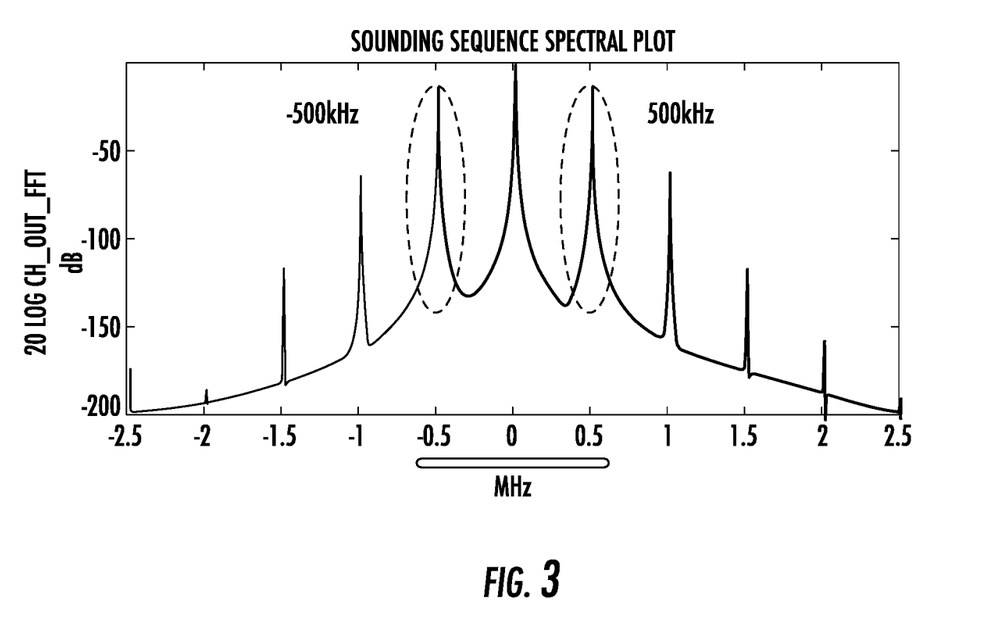
FIG. 3 shows the spectral plot of the sounding sequence.

FIG. 3 shows the spectral plot of the sounding sequence after the carrier frequency has been removed. These phase measurements can then be manipulated using a discrete Fourier transform to obtain the real and imaginary components at frequencies, f and −f. This information can be used to find the magnitude and phase at the two frequencies. In other words, $$Sum_f = \sum_{k=0}^{N} \theta_k e^{-i2\pi f k/N} \text{ and } Sum_{-f} = \sum_{k=0}^{N} \theta_k e^{i2\pi f k/N}$$

Both values, $Sum_f$ and $Sum_{-f}$, are complex values. The arc tangent of each of these values is equal to its phase. Thus, $$\theta_f = \text{atan (Im}(Sum_f), \text{Re }(Sum_f)) \text{ and } \theta_{-f} = \text{atan (Im }(Sum_{-f}), \text{Re }(Sum_{-f})).$$

Thus, $4\pi f t = (\theta_f - \theta_{-f})$ and $t = (\theta_f - \theta_{-f})/4\pi f$ Note that the phase of the incoming signal received by the second network device 110 also has other components. For example, there may be a frequency offset between the first network device 100 and the second network device 110 that contributes to the resulting phase measurement. Additionally, the first network device 100 may transmit the sounding sequence with a non-zero initial phase. Finally, the sampling clock of the second network device 110 may also have a non-zero initial phase. Note that because the two frequencies, f and −f, are transmitted simultaneously, all of these other components are common for these two frequencies. Thus, they will cancel when the two phase values are subtracted from one another.

However, there are other possible causes of inaccuracy that may be compensated for. For example, the receive circuit 36 and radio circuit 31 in the second network device 110 may introduce different phase delays for f and for −f. For example, the phase change due to the components, such as capacitors and inductors, in the receive path is a function of frequency. This collection of components may be referred to as the receive group, or Rx group. Therefore, in certain embodiments, the Rx group is calibrated at each frequency that is used for sounding sequences. The Rx group delay may be calibrated in a number of ways. For example, the calibration may be performed by the chip manufacturer and the phase delays for each frequency may be provided to the user. In another embodiment, the calibration results may be stored in a one-time programmable (OTP) portion of memory. In another embodiment, the user may perform the calibration and save the results. For example, a calibration station may be used to transmit the frequencies of interest to the second network device 110. The second network device 110 can then measure the difference in phase between these two frequencies. This difference can then be stored in an OTP Portion of memory. In yet another embodiment, a loop back test may be performed where the transmit circuit 38 and the radio circuit 31 of the second network device 110 are both in communication with the antenna 37. The second network device 110 transmits the two frequencies of interest sequentially and simultaneously measures the phase of each of these frequencies as received by the receive group. If loop back testing is performed, it may be advantageous for the second network device 110 to also calibrate the transmit circuit 38, as described in more detail below.

In all of these embodiments, the phase difference that is caused by the Rx group delay may be calculated and taken into consideration when calculating the actual phase of the first frequency and the second frequency.

Additionally, another source of error may be phase delay introduced by the transmit circuit 38 of the first network device 100. This phase error may be calculated in a number of ways. For example, the calibration may be performed by the chip manufacturer and the phase delays for each frequency may be provided to the user. In another embodiment, the calibration results may be stored in a one-time programmable (OTP) portion of memory. In another embodiment, the user may perform the calibration and save the results. For example, a calibration station may be used to receive the frequencies of interest from the first network device 100. The calibration station can then measure the difference in phase between these two frequencies. This difference can then be stored in an OTP Portion of memory. In yet another embodiment, a loop back test may be performed where the transmit circuit 38 and the radio circuit 31 of the first network device 100 are both in communication with the antenna 37. The first network device 100 transmits the two frequencies of interest sequentially and simultaneously measures the phase of each of these frequencies as received by the receive group to calculate the phase delay associated with transmission. The result of this calculation may be referred to as the transmitter phase correction.

In all of these embodiments, the phase difference that is caused by the transmit delay may be calculated and taken into consideration when calculating the actual phase of the first frequency and the second frequency.

Of course, in certain embodiments, the second network device 110 may not utilize the Rx group delay and/or the transmit delay in determining the time.

In other embodiments, the second network device 110 may transmit the plurality of phase measurements to an external device or computer to perform the DFT. The external device may then supply the calculated distance to the second network device 110.

Figure 4:
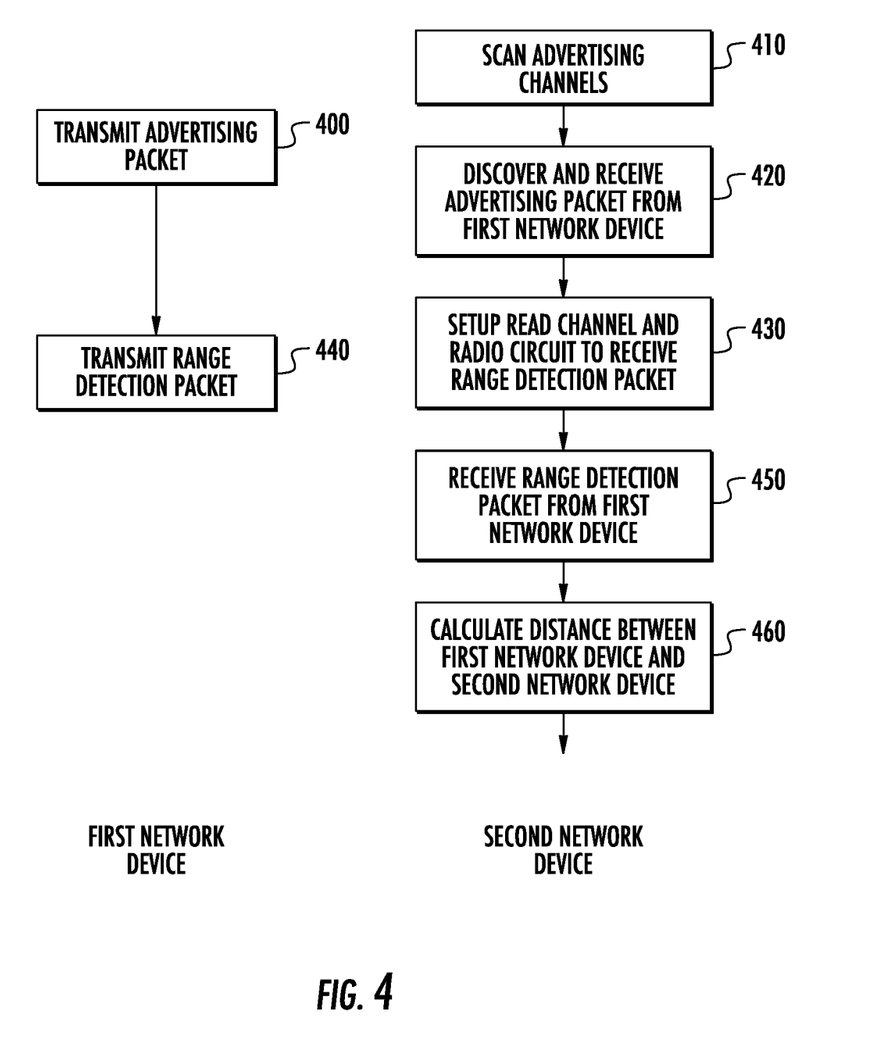
FIG. 4 shows a flowchart describing the operation of two network devices.

A one way ranging system is disclosed. This system utilizes a sounding sequence that generates two different frequencies to determine the distance between a first network device 100 and a second network device 110. FIG. 4 shows an illustrative example of how this method may be used. First, as shown in Box 400, the first network device 100 may transmit an advertising packet on an advertising channel. This advertising packet may include information about the first network device 100. This advertising packet may also include the PHY to be used during the range detection packet, such as 1 Mbps or 2 Mbps. Additionally, this advertising packet may include parameters associated with the range detection packet. These parameters may include:

the sounding sequence frequency
the channel(s) used to transmit the sounding sequence;
the hopping sequence;
the transmit phase delay and
the length of the sequence.

In parallel, as shown in Box 410, the second network device 110 may be scanning the various advertising channels. The second network device 110 may discover the advertising packet transmitted by the first network device and receive this advertising packet, as shown in Box 420. The second network device 110 then parses the packet to identify the sender, and the parameters that are associated with the corresponding range detection packet. If the second network device 110 is interested in tracking this first network device 100, the second network device 110 may, using the processing unit 20, set up the receive circuit 36 and radio circuit 31 to receive the range detection packet, as shown in Box 430. The first network device 100 may then begin transmitting the range detection packet, as shown in Box 440. The second network device 110 then receives this range detection packet, as shown in Box 450. The second network device 110 samples the phase of the incoming signal as described above. The second network device 110 may also correct for the transmit delay and the Rx group delay. Using this information, the second network device 110 computes the distance between the first network device 100 and the second network device 110, as shown in Box 460.

The distance from a first network device 100 to a second network device 110 may be used for many applications. For example, the range detection may be used in conjunction with angle of arrival or departure algorithms. For example, by determining an angle of arrival and the distance to the first network device 100, it is possible for the second network device 110 to estimate the three-dimensional position of the first network device 100. This location information may be used in a plurality of ways. For example, if a first network device is installed on each of a plurality of assets in a warehouse, the second network device may be able to identify the location of a specific asset. In some embodiments, there may be multiple locators (receivers), which each measure their distance to tag (transmitter). The locators send their measurements to a master locator (or another processing unit) that uses the locators' known positions and distance measurements to calculate tag position as the intersection of multiple spheres, similar to GPS. Further, there are applications beyond industrial asset tracking. For example, the two network devices may also operate as a proximity sensor. For example, when the user (holding a tag) approaches an automobile (acting as a locator), the doors may automatically unlock. This concept can be expanded to zone creation, where an event is triggered when a user enter/exits a geographical zone. Additionally, this system of network devices may also be used to track pets or locate personal objects.

The present system and method have many advantages. First, this system and method does not require a network connection between the first network device and the second network device. Because of this, the second network device is able to track many more devices than would be possible if the second network device was required to establish a network connection with each. Thus, the present system and method are far more scalable than two-way range detection systems. Further, this approach only requires the first network device to send a signal packet with a sounding sequence. The sounding sequence provides two frequencies that can be used by the second network device to measure the distance. Further, many sources of error are eliminated when both frequencies are sent simultaneously.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of determining a distance between two network devices, comprising:
   transmitting, from a first network device, a packet comprising a sounding sequence, wherein the sounding sequence comprises a first frequency and a second frequency that are additive inverses of each other;
   receiving, at a second network device, the packet with the sounding sequence;
   sampling, at the second network device, the packet with the sounding sequence using a sample clock to create a plurality of phase samples;
   calculating a digital Fourier transform of the plurality of phase samples to obtain real and imaginary components at each of the first frequency and the second frequency;
   calculating a first phase of the first frequency and a second phase of the second frequency using the real and imaginary components; and
   using the first frequency, the first phase and the second phase to determine a distance from the second network device to the first network device.

2. The method of claim 1, wherein calculating the digital Fourier transform is performed by the second network device.

3. The method of claim 1, further comprising removing a carrier frequency from the sounding sequence prior to the sampling.

4. The method of claim 1, wherein the first network device transmits a transmitter phase correction value to the second network device prior to the packet with the sounding sequence, the transmitter phase correction value being a difference in phase delay through transmit components of the first network device at the first frequency and the second frequency, and wherein the second network device uses the transmitter phase correction value to determine the distance from the second network device to the first network device.

5. The method of claim 1, wherein a receiver group delay is calculated for the second network device, the receiver group delay defined as a difference in phase delay through read components of the second network device at the first frequency and the second frequency, and the second network device uses the receiver group delay to determine the distance from the second network device to the first network device.

6. The method of claim 1, wherein the plurality of phase samples comprises at least 300 phase samples.

7. The method of claim 1, wherein the sounding sequence is sampled at a frequency that is greater than the first frequency.

8. The method of claim 7, wherein the sounding sequence is sampled at a frequency that is at least 5 times greater than the first frequency.

9. The method of claim 1, wherein the first frequency and the second frequency are separated by at least 250 kHz.

10. The method of claim 1, wherein the first frequency and the second frequency are separated by at least 1 MHz.

11. A network device for calculating a distance between the network device and a first network device, comprising:
    a network interface;
    a processing unit, and
    a memory device in communication with the processing unit, which comprises instructions, which when executed by the processing unit, enable the network device to:
      receive, using the network interface, a packet with a sounding sequence, wherein the sounding sequence comprises a first frequency and a second frequency that are additive inverses of each other;
      sample the packet with the sounding sequence using a sample clock to create a plurality of phase samples;
      calculate a digital Fourier transform of the plurality of phase samples to obtain real and imaginary components at each of the first frequency and the second frequency;
      calculate a first phase of the first frequency and a second phase of the second frequency using the real and imaginary components; and
      use the first frequency, the first phase and the second phase to determine a distance from the network device to the first network device.

12. The network device of claim 11, wherein the memory device further comprises instructions which enable the network device to remove a carrier frequency from the sounding sequence prior to the sampling.

13. The network device of claim 11, wherein the first network device transmits a transmitter phase correction value to the network device prior to the packet with the sounding sequence, the transmitter phase correction value being a difference in phase delay through transmit components of the first network device at the first frequency and the second frequency, and wherein the network device uses the transmitter phase correction value to determine the distance from the network device to the first network device.

14. The network device of claim 11, wherein a receiver group delay is calculated for the network device, the receiver group delay defined as a difference in phase delay through read components of the network device at the first frequency and the second frequency, and the network device uses the receiver group delay to determine the distance from the network device to the first network device.

15. The network device of claim 11, wherein the plurality of phase samples comprises at least 300 phase samples.

16. The network device of claim 11, wherein the sounding sequence is sampled at a frequency that is greater than the first frequency.

17. The network device of claim 16, wherein the sounding sequence is sampled at a frequency that is at least 5 times greater than the first frequency.

18. The network device of claim 11, wherein the first frequency and the second frequency are separated by at least 250 kHz.

19. The network device of claim 11, wherein the first frequency and the second frequency are separated by at least 1 MHz.

\* \* \* \* \*